(12) United States Patent
Cameron et al.

(10) Patent No.: US 8,626,793 B2
(45) Date of Patent: *Jan. 7, 2014

(54) OBJECT STORAGE

(75) Inventors: Donald F. Cameron, Portland, OR (US); Dancil C. Strickland, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/696,841

(22) Filed: Jan. 29, 2010

(65) Prior Publication Data

US 2010/0145995 A1    Jun. 10, 2010

Related U.S. Application Data

(63) Continuation of application No. 10/792,417, filed on Mar. 2, 2004, now Pat. No. 7,680,864.

(51) Int. Cl.
*G06F 7/00* (2006.01)
*G06F 17/30* (2006.01)

(52) U.S. Cl.
USPC .......................................................... 707/781

(58) Field of Classification Search
USPC .......................................................... 707/781
See application file for complete search history.

(56) References Cited

U.S. PATENT DOCUMENTS

| | | | |
|---|---|---|---|
| 4,310,883 A * | 1/1982 | Clifton et al. .......................... | 1/1 |
| 5,014,192 A * | 5/1991 | Mansfield et al. ..................... | 1/1 |
| 6,269,431 B1 | 7/2001 | Dunham | |
| 6,353,878 B1 * | 3/2002 | Dunham ........................ | 711/162 |
| 6,571,259 B1 | 5/2003 | Zheng et al. | |
| 6,574,717 B1 * | 6/2003 | Ganesh et al. ................. | 711/147 |
| 6,823,393 B1 | 11/2004 | Hericourt | |
| 6,823,398 B1 | 11/2004 | Lee et al. | |
| 6,973,556 B2 | 12/2005 | Milligan et al. | |

(Continued)

FOREIGN PATENT DOCUMENTS

| | | |
|---|---|---|
| CN | 1926505 A | 3/2007 |
| WO | 99/08173 A2 | 2/1999 |
| WO | 01/75566 A2 | 10/2001 |
| WO | 2005/093559 A2 | 10/2005 |

OTHER PUBLICATIONS

Patterson et. al. "A Case for Redundant Arrays of Inexpensive Disks (RAID)" 1988. ACM SIGMOD international conference on Management of data. pp. 109-116.*

(Continued)

*Primary Examiner* — Robert Beausoliel, Jr.
*Assistant Examiner* — Michael Pham
(74) *Attorney, Agent, or Firm* — Christopher K. Gagne

(57) ABSTRACT

In one embodiment, a method is provided that may include determining, at least in part, by a device comprised, at least in part, in storage, whether to request that the storage perform, at least in part, at least one operation. The at least one operation may involve, at least in part, at least one object stored in the storage. The determining may be based, at least in part, upon metadata associated with the at least one object. The metadata may be stored in the storage, and may indicate an earliest permitted deletion time for the at least one object and/or a latest permitted access time for the at least one object. Of course, many modifications, variations, and alternatives are possible without departing from this embodiment.

21 Claims, 3 Drawing Sheets

(56) References Cited

U.S. PATENT DOCUMENTS

| | | | |
|---|---|---|---|
| 7,047,386 B1* | 5/2006 | Ngai et al. | 711/170 |
| 7,136,885 B2 | 11/2006 | Wright, Jr. et al. | |
| 7,269,612 B2* | 9/2007 | Devarakonda et al. | 707/694 |
| 7,272,613 B2 | 9/2007 | Sim et al. | |
| 7,590,807 B2* | 9/2009 | McGovern et al. | 711/159 |
| 7,680,864 B2 | 3/2010 | Cameron et al. | |
| 2003/0078938 A1 | 4/2003 | Noble | |
| 2003/0101167 A1* | 5/2003 | Berstis | 707/3 |
| 2003/0182332 A1* | 9/2003 | McBrearty et al. | 707/206 |
| 2003/0225801 A1* | 12/2003 | Devarakonda et al. | 707/205 |
| 2004/0064474 A1* | 4/2004 | Hitz et al. | 707/102 |
| 2004/0122873 A1 | 6/2004 | Wright, Jr. et al. | |
| 2004/0249841 A1 | 12/2004 | Cameron et al. | |
| 2005/0055518 A1* | 3/2005 | Hochberg et al. | 711/159 |
| 2005/0055519 A1* | 3/2005 | Stuart et al. | 711/159 |

OTHER PUBLICATIONS

Kenny, S. et al., "Applying digital rights management systems to privacy rights management", Computers & Security, Elsevier Science Publishers, Amsterdam, NL, vol. 21, No. 7, Nov. 2002, pp. 648-664.
Office Action received for Chinese Application No. 200580006651.0, mailed on Sep. 21, 2007, 2 pages.
Office Action received for European Application No. 05713487.6, mailed on Oct. 31, 2008, 5 pages.
Office Action received for European Application No. 05713487.6, mailed on Jul. 13, 2007, 5 pages.
Response to Office Action received for Chinese Application No. 200580006651.0, filed on Feb. 4, 2008, 4 pages.
Response to Office Action received for European Application No. 05713487.6, filed on Mar. 10, 2009, 9 pages.
Response to Office Action received for European Application No. 05713487.6, filed on Nov. 19, 2007, 16 pages.
Office Action received for Singaporean Application No. 200605362-3 mailed on Jun. 27, 2008, 6 pages.
Office Action received for U.S. Appl. No. 10/792,417, mailed on Jan. 12, 2007, 23 Pages.
Response to Office Action received for U.S. Appl. No. 10/792,417, filed on Jun. 8, 2007, 16 Pages.
Office Action received for U.S. Appl. No. 10/792,417, mailed on Aug. 22, 2007, 21 Pages.
Response to Office Action received for U.S. Appl. No. 10/792,417, filed on Jan. 22, 2008, 14 Pages.
Office Action received for U.S. Appl. No. 10/792,417, mailed on May 6, 2008, 24 Pages.
Response to Office Action received for U.S. Appl. No. 10/792,417, filed on Sep. 12, 2008, 14 Pages.
Office Action received for U.S. Appl. No. 10/792,417, mailed on Dec. 24, 2008, 28 Pages.
Response to Office Action received for U.S. Appl. No. 10/792,417, filed on Apr. 20, 2009, 16 Pages.
Office Action received for U.S. Appl. No. 10/792,417, mailed Jul. 22, 2009, 28 Pages.
Response to Office Action received for U.S. Appl. No. 10/792,417, filed on Sep. 11, 2009, 14 Pages.
International Search Report received for PCT Application No. PCT/US2005/004594 mailed on Nov. 7, 2005, 12 pages.
Office Action received for Singapore Patent Application No. 200605362-3 mailed on May 30, 2008, 6 pages.
Office Action received for Singapore Patent Application No. 200605362-3 mailed on Jan. 22, 2009, 5 pages.
International Preliminary Report on Patentability and Written Opinion received for PCT Application No. PCT/US2005/004594 mailed on Sep. 14, 2006, 7 pages.
Office Action received for Chinese Patent Application No. 200580006651.0, mailed on Jun. 19, 2009, 6 Pages of Office Action and 6 Pages of Translation.
Notice of Allowance received for U.S. Appl. No. 10/792,417, mailed on Dec. 18, 2009, 21 pages.
Response to Office Action received for Chinese Patent Application No. 200580006651.0, filed on Sep. 4, 2009, 08 pages of English Translation and 10 pages of Response.
Response to Office Action received for Singapore Patent Application No. 200605362-3, filed on Sep. 26, 2008, 7 pages.
Office Action received for European Patent Application No. 05713487.6, mailed on Jul. 13, 2007, 5 pages.
Response to Office Action received for Chinese Patent Application No. 200580006651.0, filed on Jan. 7, 2010, 4 pages of English Translation and 4 pages of Response.
Office Action received for Chinese Patent Application No. 200580006651.0, mailed on Oct. 23, 2009, 6 Pages of Office Action and 7 Pages of Translation.
Office Action received for the Chinese Patent Application No. 200580006651.0, mailed on Mar. 18, 2010, 6 pages of Office Action and 11 pages of translation.
Response to Office Action received fro the Chinese Patent Application No. 200580006651.0, filed on Jun. 29, 2010, 10 pages of English translation and 10 pages of Response.
Office Action received for the Chinese Patent Application No. 200580006651.0, mailed on Jun. 27, 2008, 1 page of English translation.
Response to Office Action received for the Chinese Patent Application No. 200580006651.0, filed on Sep. 12, 2008, 1 page of English translation Only.
Specification filed with Payment of the Grant Fee for Singapore Patent Application No. 200605362-3 filed on May 13, 2009, 23 pages.

* cited by examiner

OBJECT STORAGE

CROSS-REFERENCE TO RELATED APPLICATIONS

This application is a continuation of prior co-pending U.S. patent application Ser. No. 10/792,417, filed Mar. 2, 2004, entitled "Method and Apparatus for Managing Access to Stored Objects Based on Retention Policy" which is incorporated by reference herein in its entirety.

FIELD

This disclosure relates to object storage.

BACKGROUND

In one conventional data storage system, an array of mass storage devices is coupled to a host. The array stores a plurality of files. Depending upon the particular files' contents, a subset of the files may be subject to a data retention policy promulgated by governmental and/or other authority. For example, such a retention policy may mandate that a file containing a certain type of information must be retained for at least a predetermined minimum period of time, but cannot be retained longer than a predetermined maximum period of time.

In this conventional data storage system, in order to comply with the mandated retention policy, the host executes program processes that determine which of the files should be retained and/or deleted in accordance with the policy. As a result of execution of these processes, the host periodically requests deletion of files stored in the array, and the host prevents user-initiated file deletion requests from being issued to the array, in order to permit files to be deleted and prevented from being deleted, respectively, in accordance with the policy. Unfortunately, the execution of these processes by the host may consume an undesirably large amount of host processing bandwidth. Additionally, if the host fails to execute these processes, one or more files may be retained or deleted in violation of the policy.

BRIEF DESCRIPTION OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly.

DETAILED DESCRIPTION

Figure 1:
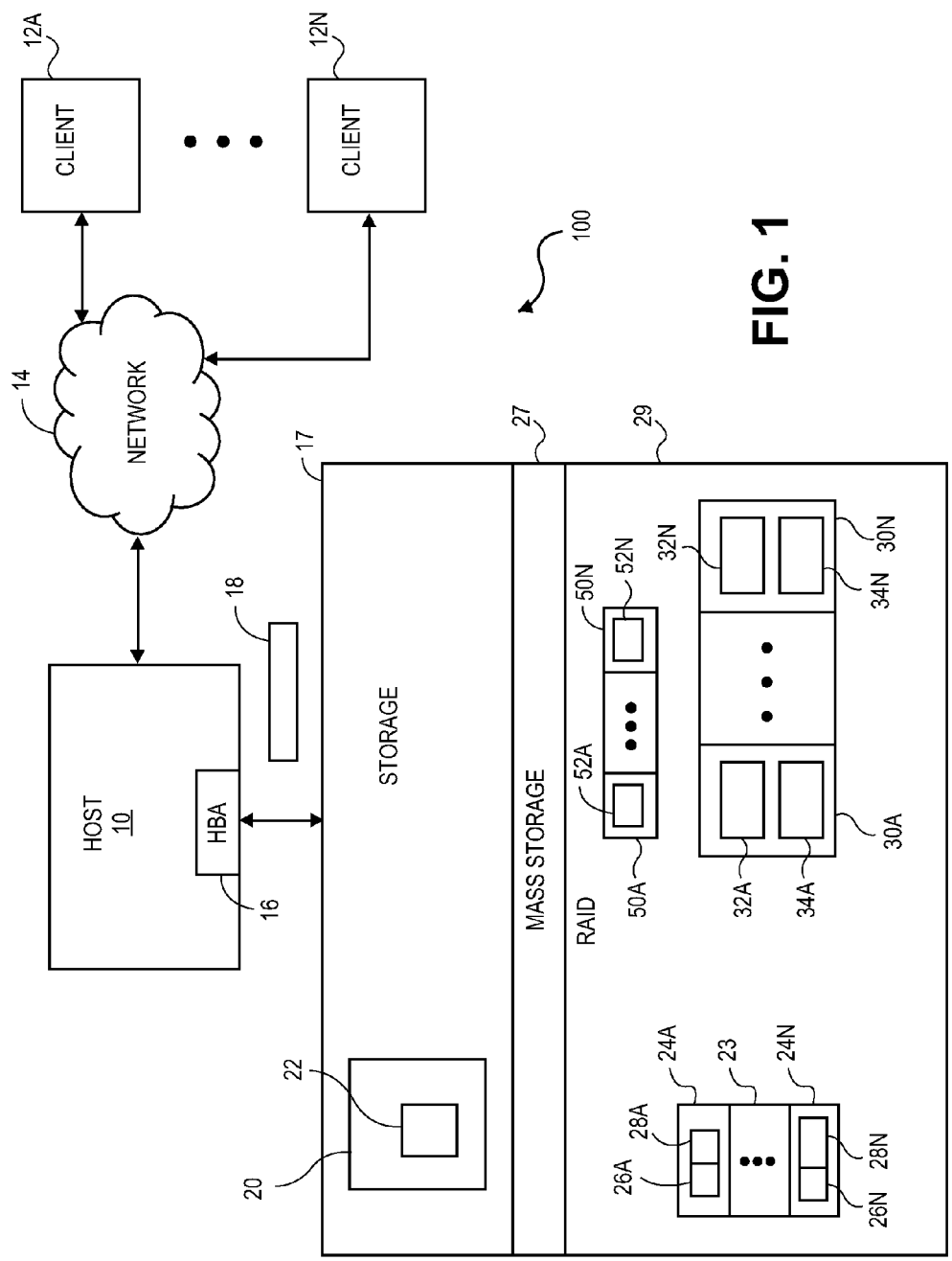
FIG. 1 illustrates a system embodiment.

FIG. 1 illustrates a system embodiment 100. System 100 may include a host 10 communicatively coupled via a network 14 to one or more clients 12A . . . 12N. Host 10 may comprise a host bus adapter (HBA) 16 via which host 10 also may be communicatively coupled to storage 17. As used herein, "communicatively coupled" means capable of transmitting and/or receiving data and/or commands.

Although not shown in the Figures, host 10 and one or more clients 12A . . . 12N each may comprise one or more respective processors, memory, and/or user interface systems. These respective memories may store respective sets of program instructions that may be executed by these one or more respective processors. The execution of these respective sets of program instructions by the respective processors may result in host 10 and one or more clients 12A . . . 12N performing the operations that host 10 and one or more clients 12A . . . 12N are described herein as performing in accordance with one or more embodiments. The respective user interface systems may permit human operators to exchange one or more commands and/or data with host 10 and/or one or more clients 12A . . . 12N so as to permit the human operators to be able to control and/or monitor operation of host 10 and/or one or more clients 12A . . . 12N.

For example, although not shown in the Figures, host 10 and one or more clients 12A . . . 12N each may comprise a respective processor that may be coupled via a respective chipset to a respective bus system, a respective user interface system, and a respective system memory. Each respective chipset may comprise a respective host bridge/hub system and a respective input/output (I/O) bridge/hub system. Each respective user interface system may comprise, e.g., a keyboard, pointing device, and display system that may permit a human user to input commands to, and monitor the operation of, host 10, one or more clients 12A . . . 12N, and/or system 100. The respective bus system in host 10 may be coupled to HBA 16 and to network interface circuitry (not shown). This network interface circuitry may be coupled to network 14.

System embodiment 100 may comprise storage 17. Storage 17 may be coupled to HBA 16, and may comprise mass storage 27 that may comprise redundant array of inexpensive disks (RAID) 29. As used herein, the terms "storage" and "storage device" may be used interchangeably to mean one or more apparatus into, and/or from which, data may be stored and/or retrieved, respectively. Also, as used herein, the term "mass storage" means storage capable of non-volatile storage of data. For example, in this embodiment, mass storage may include, without limitation, one or more non-volatile magnetic, optical, and/or semiconductor storage devices. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry.

The RAID level that may be implemented by RAID 29 may be 0, 1, or greater than 1. Depending upon, for example, the RAID level implemented in RAID 29, the number of storage devices comprised in RAID 29 may vary so as to permit the number of such storage devices to be at least sufficient to implement the RAID level implemented in RAID 29.

In this embodiment, HBA 16 may be capable of exchanging data and/or commands with storage 17 in accordance with, e.g., Small Computer Systems Interface (SCSI) protocol, Fibre Channel (FC) protocol, SCSI over Internet Protocol (iSCSI), Serial Attached SCSI (SAS) protocol, and/or Serial Advanced Technology Attachment (S-ATA) protocol. In accordance with this embodiment, if HBA 16 and storage 17 exchange data and/or commands in accordance with SCSI protocol, the SCSI protocol may comply and/or be compatible with the protocol described in American National Standards Institute (ANSI) Small Computer Systems Interface-2 (SCSI-2) ANSI X3.131-1994 Specification. If HBA 16 and storage 17 exchange data and/or commands in accordance with FC protocol, the FC protocol may comply and/or be compatible with the protocol described in ANSI Standard Fibre Channel (FC) Physical and Signaling Interface-3× 3.303:1998 Specification. If the HBA 16 and storage 17 exchange data and/or commands in accordance with iSCSI protocol, the iSCSI protocol may comply and/or be compatible with the protocol described in Satran, "iSCSI," Internet-Draft Specification, draft-ietf-ips-iscsi-19, IP Storage Working Group of the Internet Engineering Task Force, published Nov. 3, 2002, by the Internet Engineering Task Force, Internet Engineering Task Force Secretariat c/o Corporation for National Research Initiatives, 1895 Preston White Drive, Suite 100, Reston, Va. 20191, United States of America. If HBA 16 and storage 17 exchange data and/or commands in accordance with SAS protocol, the SAS protocol may comply and/or be compatible with the protocol described in "Information Technology—Serial Attached SCSI (SAS)," Working Draft American National Standard of International Committee For Information Technology Standards (INCITS) T10 Technical Committee, Project T10/1562-D, Revision 2b, published 19 Oct. 2002, by American National Standards Institute. If HBA 16 and storage 17 exchange data and/or commands in accordance with S-ATA protocol, the S-ATA protocol may comply and/or be compatible with the protocol described in "Serial ATA: High Speed Serialized AT Attachment," Revision 1.0, published on Aug. 29, 2001 by the Serial ATA Working Group. Of course, alternatively or additionally, HBA 16 and storage 17 may exchange data and/or commands via one or more other and/or additional protocols without departing from this embodiment.

RAID 29 may store object table data structure 23 and objects 30A . . . 30N. Object table 23 may comprises a plurality of entries 24A . . . 24N that may comprise identifiers 26A . . . 26N and associated pointers 28A . . . 28N. For example, entry 24A may comprise identifier 26A and an associated pointer 28A, and entry 24N may comprise identifier 26N and an associated pointer 28N.

In accordance with this embodiment, the respective identifiers 26A . . . 26N may comprise respective unique values that may respectively identify respective objects 30A . . . 30N, and respective pointers 28A . . . 28N may point to respective objects 30A . . . 30N. As used herein, a "pointer" means one or more symbols and/or values that point to (i.e., indicate, at least in part) one or more locations. For example, in this embodiment, pointers 28A . . . 28N may comprise respective starting addresses of objects 30A . . . 30N. In this embodiment, identifier 26A and associated pointer 28A may uniquely identify and point to, respectively, object 30A. Also, for example, identifier 26N and associated pointer 28N may uniquely identify and point to, respectively, object 30N.

As used herein, an "object" comprises data and metadata. For example, in this embodiment, objects 30A . . . 30N may comprise respective collections 34A . . . 34N of related and/or associated data, and respective metadata 32A . . . 32N. Also as used herein, "metadata" comprises data that describes, at least in part, other data. In this embodiment, metadata 32A . . . 32N may respectively describe, at least in part, data 34A . . . 34N. For example, metadata 32A may describe, at least in part, data 34A, and metadata 32N may describe, at least in part, data 34N, respectively.

Figure 2:
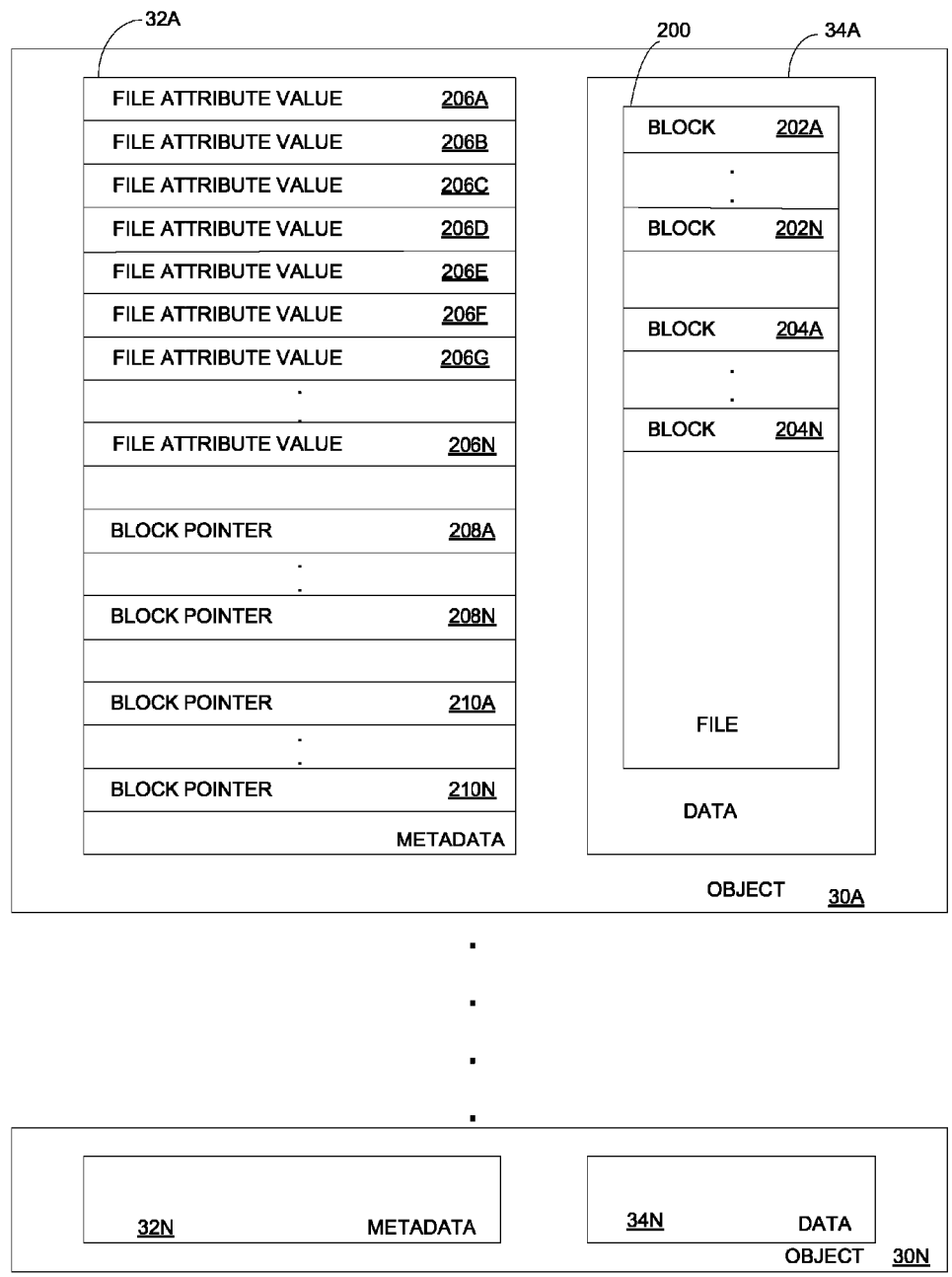
FIG. 2 illustrates an object according to an embodiment.

FIG. 2 illustrates an example of metadata 32A and data 34A that may be comprised in one or more objects (e.g., object 30A) according to an embodiment. The types of data and/or metadata that may be comprised in objects according to this embodiment may differ from or be the same as that illustrated in FIG. 2.

However, in this example, data 34A may comprise user and/or application data that may comprise one or more files 200. As used herein, a "file" comprises data accessible, at least in part, using a file system, such as, for example, in this embodiment, a network file system. One or more files 200 may comprise one or more blocks 202A . . . 202N and/or one or more blocks 204A . . . 204N. As used herein, a "block" means a fixed sized unit of data. For example, in this embodiment, blocks 202A . . . 202N and 204A . . . 204N each may comprise a respective disk block or disk sector comprising, e.g., 512 bytes. However, blocks 202A . . . 202N and/or blocks 204A . . . 204N may comprise one or more other types and/or sizes of blocks without departing from this embodiment.

For example, in this embodiment, metadata 32A may include one or more values that may be included in, for example, an index node. Additionally or alternatively, in this embodiment, metadata 32A may comprise one or more respective values 206A . . . 206N, 208A . . . 208N, and 210A . . . 210N that may describe, at least in part, object 30A and/or data 34A. Values 206A . . . 206N may indicate, at least in part, one or more respective attributes of one or more files 200. For example, in this embodiment, one or more respective values 206A, 206B, 206C, 206D, 206E, 206F, 206G, and 206N respectively may indicate, at least in part, an earliest permitted deletion time for one or more objects (e.g., object 30A) and/or one or more portions of such one or more objects, a latest permitted access time for one or more objects (e.g., object 30A) and/or one or more portions of such one or more objects, one or more names of one or more files (e.g., one or more files 200) in the one or more objects, one or more possessors of right to access one or more files 200, one or more sizes of one or more files 200, one or more creation times of one or more files 200, and/or one or more most recent access times of one or more files 200. As used herein, a "time" may comprise one or more times and/or one or more dates. Also as used herein, "accessing" data comprises reading the data and/or writing the data. The one or more earliest permitted deletion times and/or the one or more latest permitted access times indicated, at least in part, by one or more values 206A and/or one or more values 206B, respectively, may be in accordance, comply, and/or be compatible with, for example, one or more governmental and/or other data retention and/or data deletion policies.

Values 208A . . . 208N may be or comprise one or more respective pointers that may point to one or more blocks 202A . . . 202N comprised in one or more files 200. Values 210A . . . 210N may be or comprise one or more respective pointers that may point to one or more respective blocks 50A . . . 50N stored in RAID 29. Blocks 50A . . . 50N may comprise one or more respective pointers 52A . . . 52N that may point to one or more blocks 204A . . . 204N comprised in one or more files 200.

Turning again to FIG. 1, storage 17 may comprise storage controller 20. Controller 20 may comprise processor 22 and memory (not shown). This memory may comprise instructions that may be executed by processor 22. When these instructions are executed by processor 22, this may result in processor 22, controller 20, storage 17, mass storage 27, and/or RAID 29 performing the operations described herein as being performed by processor 20, storage 17, mass storage 27, and/or RAID 29. As used herein, a "processor" means circuitry capable of performing one or more arithmetic operations and/or one or more logical operations.

These and other operations 300 will be described in reference to FIG. 3. After, for example, a reset of storage 17, host 10 may issue, via HBA 16, one or more requests to storage 17 that storage 17 store user and/or application data. This may result in controller 20 and/or processor 22 requesting that storage 17 store in RAID 29 one or more objects 30A . . . 30N comprising this user and/or application data and metadata describing, at least in part, the user and/or application data. This may also result in controller 20 and/or processor 22 requesting that storage 17 store in one or more entries 24A . . . 24N in table 23 in RAID 29 one or more identifiers 26A . . . 26N and one or more pointers 28A . . . 28N, and also may result in controller 20 and/or processor 22 requesting that storage 17 store in one or more blocks 50A . . . 50N in RAID 29 one or more pointers 52A . . . 52N. In response to these requests from controller 20 and/or processor 22, storage 17 may store one or more objects 30A . . . 30N in RAID 29, one or more identifiers 26A . . . 26N and one or more pointers 28A . . . 28N in entries 24A . . . 24N in table 23 in RAID 29, and one or more pointers 52A . . . 52N in one or more blocks 50A . . . 50N in RAID 29.

Thereafter, a client (e.g., client 12A) may issue to host 10 via network 14 a request for storage 17 to perform one or more operations involving at least one of the objects 30A . . . 30N. For example, in this embodiment, the one or more operations may comprise accessing and/or modifying at least one (e.g., object 30A) of the objects 30A . . . 30N. In this embodiment, these one or more operations may comprise any combination of one or more of the following operations: deleting, at least in part, from storage 17 at least one object 30A, reading, at least in part, at least one object 30A, and/or overwriting, at least in part, at least one object 30A. In response, at least in part, to receipt by host 10 of the request from client 12A, a processor in host 10 may signal HBA 16. This may result in HBA 16 issuing a request 18 to storage 17 that requests that storage 17 perform one or more operations that correspond to the one or more operations requested by the request issued by client 12A.

Figure 3:
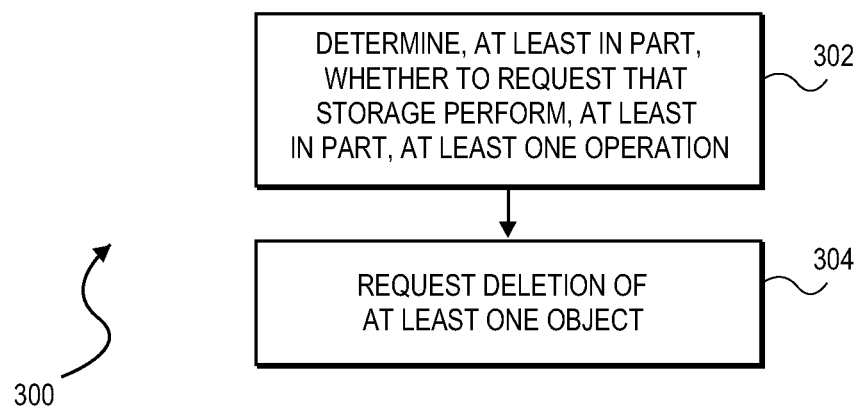
FIG. 3 illustrates operations that may be performed according to an embodiment.

In response, at least in part, to receipt by storage 17 of request 18 from HBA 16, controller 20 and/or processor 22 may determine, at least in part, whether to request that storage 17 perform, at least in part, the one or more operations whose performance by storage 17 is requested by request 18, as illustrated by operation 302 in FIG. 3. In this embodiment, controller 20 and/or processor 22 may make this determination based, at least in part, upon metadata (e.g., metadata 32A) associated with the at least one object 30A involved in the one or more operations whose performance by storage 17 is requested by request 18. For example, in this embodiment, if request 18 requests deletion, at least in part, of object 30A, such as, for example, deletion of one or more files 200, the controller 20 and/or processor 22 may examine one or more values 206A, and may determine, based at least in part upon one or more values 206A, an earliest permitted deletion time for one or more files 200. If the time at which controller 20 and/or processor 22 make this determination is prior to this earliest permitted deletion time for one or more files 200, controller 20 and/or processor 22 may determine not to permit, and therefore, not to request performance by storage 17 of the deletion of one or more files 200 requested by request 18; accordingly, controller 20 and/or processor 22 may determine, as a result of operation 302, not to request that storage 17 perform, at least in part, one or more operations requested by request 18. Controller 20 and/or processor 22 may provide a message to HBA 16 that may indicate that controller 20 and/or processor 22 has determined not to permit, at least in part, one or more operations requested by request 18.

Conversely, if the time at which controller 20 and/or processor 22 make this determination is contemporaneous with or after this earliest permitted deletion time for one or more files 200, controller 20 and/or processor 22 may determine to permit, and therefore, to request performance by storage 17 of the deletion of one or more files 200 requested by request 18; accordingly, controller 20 and/or processor 22 may determine, as a result of operation 302, to request that storage 17 perform, at least in part, one or more operations requested by request 18. In response, at least in part, to this determination, controller 20 and/or processor 22 may issue a request to storage 17 that storage 17 delete one or more files 200 and modify metadata 32A appropriately in view of deletion of one or more files 200. This may result in deletion by RAID 29 of one or more files 200, and modification by RAID 29 of metadata 32A as appropriate in view of deletion of one or more files 200. As used herein, "deletion" of data comprises making the data available to be overwritten, at least in part, and/or permitting the data to be overwritten, at least in part. Alternatively or additionally, if data 34A comprises only one or more files 200, controller 20 and/or processor 22 may issue a request to storage 17 that storage 17 delete object 30A, as illustrated by operation 304 in FIG. 3. This may result in deletion by RAID 29 of entry 24A, one or more blocks 50A . . . 50N, and object 30A.

Also conversely, if, for example, in this embodiment, request 18 requests reading, at least in part, of object 30A, such as, for example, reading, at least in part, of one or more files 200, the controller 20 and/or processor 22 may examine one or more values 206B, and may determine, based at least in part upon one or more values 206B, a latest permitted access time for object 30A and/or one or more files 200. If the time at which controller 20 and/or processor 22 make this determination is prior to or contemporaneous with this latest permitted access time, controller 20 and/or processor 22 may determine to permit, and therefore, to request performance by storage 17 of the reading of one or more files 200 requested by request 18; accordingly, controller 20 and/or processor 22 may determine, as a result of operation 302, to request that storage 17 perform, at least in part, one or more operations requested by request 18. Controller 20 and/or processor 22 then may request that storage 17 read, at least in part, one or more files 200. This may result in RAID 29 reading, at least in part, one or more files 200, and controller 20 and/or processor 22 may provide the data read from one or more files 200 to HBA 16. Host 10 then may forward the read data to client 12A via network 14.

Conversely, if the time at which controller 20 and/or processor 22 make this determination is after this latest permitted access time, controller 20 and/or processor 22 may determine not to permit, and therefore, not to request performance by storage 17 of the reading of one or more files 200 requested by request 18; accordingly, controller 20 and/or processor 22 may determine, as a result of operation 302, not to request that storage 17 perform, at least in part, one or more operations requested by request 18. Controller 20 and/or processor 22 may provide a message to HBA 16 that may indicate that controller 20 and/or processor 22 have determined not to permit, at least in part, one or more operations requested by request 18.

Further conversely, if, for example, in this embodiment, request 18 requests overwriting, at least in part, of object 30A, such as, for example, overwriting, at least in part, of one or more files 200, the controller 20 and/or processor 22 may examine one or more values 206B, and may determine, based at least in part upon one or more values 206B, a latest permitted access time for object 30A and/or one or more files 200. If the time at which controller 20 and/or processor 22 make this determination is prior to or contemporaneous with this latest permitted access time, controller 20 and/or processor 22 may determine to permit, and therefore, to request performance by storage 17 of the overwriting, at least in part, of one or more files 200 requested by request 18; accordingly, controller 20 and/or processor 22 may determine, as a result of operation 302, to request that storage 17 perform, at least in part, one or more operations requested by request 18. Controller 20 and/or processor 22 then may request that storage 17 overwrite, at least in part, one or more files 200, and modify, as appropriate given this overwriting, at least in part of one or more files 200, metadata 32A. This may result in RAID 29 overwriting, at least in part, one or more files 200, and also may result in RAID 29 modifying, as appropriate given this overwriting, at least in part of one or more files 200, metadata 32A.

Conversely, if the time at which controller 20 and/or processor 22 make this determination is after this latest permitted access time, controller 20 and/or processor 22 may determine not to permit, and therefore, not to request performance by storage 17 of the overwriting, at least in part, of one or more files 200 requested by request 18; accordingly, controller 20 and/or processor 22 may determine, as a result of operation 302, not to request that storage 17 perform, at least in part, one or more operations requested by request 18. Controller 20 and/or processor 22 may provide a message to HBA 16 that may indicate that controller 20 and/or processor 22 have determined not to permit, at least in part, one or more operations requested by request 18.

Additionally or alternatively, in this embodiment, controller 20 and/or processor 22 may periodically examine one or more values 206B, and may determine based at least in part upon one or more values, the latest permitted access time for object 30A and/or one or more files 200. If the time at which such examination takes place is contemporaneous with or after this latest permitted access time, controller 20 and/or processor 22 may issue a request to storage 17 that storage 17 delete object 30A and/or delete one or more files 200. If this request requests that storage 17 delete object 30A and/or if data 34A only comprises one or more files 200, this may result in RAID 29 deleting object 30A, one or more blocks 50A . . . 50N, and entry 24A. Conversely, if data 34A comprises data in addition to one or more files 200, this request issued to storage 17 by controller 20 and/or processor 22 may request that RAID delete one or more files 200 and modify metadata 32A, as appropriate, given this deletion of one or more files 200.

Thus, one system embodiment may comprise storage that may comprise, at least in part, a device that may be capable of determining, at least in part, whether to request that the storage perform, at least in part, at least one operation. The at least one operation may involve, at least in part, at least one object stored in the storage. The determining, at least in part, by the device may be based, at least in part, upon metadata associated with the at least one object. The metadata may be stored in the storage, and may indicate an earliest permitted deletion time for the at least one object and/or a latest permitted access time for the at least one object. The storage also may comprise a RAID.

Advantageously, these features of this system embodiment may permit the storage in this system embodiment to be able to enforce compliance with one or more data retention and/or deletion policies. Advantageously, in this embodiment, this may make it unnecessary for a host to periodically request deletion of files stored in the storage, and/or for the host to prevent user-initiated file deletion requests from being issued to the storage, in order to permit files to be deleted and prevented from being deleted, respectively, in accordance with the policy.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
storage including magnetic and semiconductor mass storage;
a device to determine, at least in part, whether to permit performance by the storage of a request to delete, at least in part, at least one object that includes at least one file stored in the storage, the device to determine, at least in part, whether to permit the performance by the storage of the request to delete based at least in part upon an earliest permitted deletion time for the at least one file, the device to determine, based at least in part upon comparison, at one or more times, by the device, of a current time with a latest permitted access time for the at least one file, whether to issue from the device another request that the storage delete the at least one file, the earliest permitted deletion time for the at least one file and the latest permitted access time for the at least one file being to enforce one or more policies;
at least one name of the at least one file, at least one possessor of right to access the at least one file, at least one size of the at least one file, at least one creation time of the at least one file, at least one most recent access time of the at least one file, the earliest permitted deletion time for the at least one file, and the latest permitted access time for the at least one file being indicated by different respective values stored in metadata of the object in the storage;
the device to determine whether the earliest permitted deletion time for the at least one file is prior to the current time, and if the earliest permitted deletion time for the at least one file is prior to the current time, the device is to determine not to permit the performance by the storage of the request to delete; and
if the current time is later than the latest permitted access time for the at least one file, the device is to issue the another request that the storage delete the at least one file.

2. The apparatus of claim 1, wherein: the storage comprises a redundant array of disks.

3. The apparatus of claim 1, wherein: the storage is to communicate with a host via one or more of the following:
a Small Computer Systems Interface (SCSI) over Internet Protocol (IP) protocol;
a Serial Attached SCSI (SAS) protocol; and
a Serial Advanced Technology Attachment (S-ATA) protocol.

4. The apparatus of claim 1, wherein: the device is coupled to a host bus adapter.

5. The apparatus of claim 1, wherein:
the device is to periodically examine the latest permitted access time for the at least one file to determine whether a current examination time is contemporaneous with or after the latest permitted access time for the at least one file.

6. The apparatus of claim 1, wherein:
the storage comprises a redundant array of inexpensive disks (RAID) having a RAID level of 1;
the at least one file comprises blocks in the storage and is accessible via a network file system; and the device comprises a storage controller that comprises a processor.

7. A method comprising:
  determining, at least in part, by a device whether to permit performance by storage of a request to delete, at least in part, at least one object that includes at least one file stored in the storage, the device to determine, at least in part, whether to permit the performance by the storage of the request to delete based at least in part upon an earliest permitted deletion time for the at least one file; and
  determining by the device, based at least in part upon comparison, at one or more times, by the device, of a current time with a latest permitted access time for the at least one file, whether to issue from the device another request that the storage delete the at least one file, the earliest permitted deletion time for the at least one file and the latest permitted access time for the at least one file being to enforce one or more policies, the storage including magnetic and semiconductor mass storage;
  at least one name of the at least one file, at least one possessor of right to access the at least one file, at least one size of the at least one file, at least one creation time of the at least one file, at least one most recent access time of the at least one file, the earliest permitted deletion time for the at least one file, and the latest permitted access time for the at least one file being indicated by different respective values stored in metadata of the object in the storage;
  the device to determine whether the earliest permitted deletion time for the at least one file is prior to the current time, and if the earliest permitted deletion time for the at least one file is prior to the current time, the device is to determine not to permit the performance by the storage of the request to delete; and
  if the current time is later than the latest permitted access time for the at least one file, the device is to issue the another request that the storage delete the at least one file.

8. The method of claim 7, wherein: the storage comprises a redundant array of disks.

9. The method of claim 7, wherein:
  the storage is to communicate with a host via one or more of the following:
  a Small Computer Systems Interface (SCSI) over Internet Protocol (IP) protocol;
  a Serial Attached SCSI (SAS) protocol; and
  a Serial Advanced Technology Attachment (S-ATA) protocol.

10. The method of claim 7, wherein: the device is coupled to a host bus adapter.

11. The method of claim 7, wherein:
  the device is to periodically examine the latest permitted access time for the at least one file to determine whether a current examination time is contemporaneous with or after the latest permitted access time for the at least one file.

12. The method of claim 7, wherein:
  the storage comprises a redundant array of inexpensive disks (RAID) having a RAID level of 1;
  the at least one file comprises blocks in the storage and is accessible via a network file system; and
  the device comprises a storage controller that comprises a processor.

13. A non-transitory computer-readable memory storing instructions that when executed by a machine result in operations comprising:
  determining, at least in part, by a device whether to permit performance by storage of a request to delete, at least in part, at least one object that includes at least one file stored in the storage, the device to determine, at least in part, whether to permit the performance based at least in part upon an earliest permitted deletion time for the at least one file; and
  determining by the device, based at least in part upon comparison, at one or more times, by the device, of a current time with a latest permitted access time for the at least one file, whether to issue from the device another request that the storage delete the at least one file, the earliest permitted deletion time for the at least one file and the latest permitted access time for the at least one file being to enforce one or more policies, the storage including magnetic and semiconductor mass storage;
  at least one name of the at least one file, at least one possessor of right to access the at least one file, at least one size of the at least one file, at least one creation time of the at least one file, at least one most recent access time of the at least one file, the earliest permitted deletion time for the at least one file, and the latest permitted access time for the at least one file being indicated by different respective values stored in metadata of the object in the storage;
  the device to determine whether the earliest permitted deletion time for the at least one file is prior to the current time, and if the earliest permitted deletion time for the at least one file is prior to the current time, the device is to determine not to permit the performance by the storage of the request to delete; and
  if the current time is later than the latest permitted access time for the at least one file, the device is to issue the another request that the storage delete the at least one file.

14. The memory of claim 13, wherein: the storage comprises a redundant array of disks.

15. The memory of claim 13, wherein:
  the storage is to communicate with a host via one or more of the following:
  a Small Computer Systems Interface (SCSI) over Internet Protocol (IP) protocol;
  a Serial Attached SCSI (SAS) protocol; and
  a Serial Advanced Technology Attachment (S-ATA) protocol.

16. The memory of claim 13, wherein: the device is coupled to a host bus adapter.

17. The non-transitory computer-readable memory of claim 13, wherein:
  the device is to periodically examine the latest permitted access time for the at least one file to determine whether a current examination time is contemporaneous with or after the latest permitted access time for the at least one file.

18. The non-transitory computer-readable memory of claim 13, wherein:
  the storage comprises a redundant array of inexpensive disks (RAID) having a RAID level of 1;
  the at least one file comprises blocks in the storage and is accessible via a network file system; and
  the device comprises a storage controller that comprises a processor to execute the operations.

19. A system comprising:
  storage that comprises magnetic and semiconductor mass storage; and
  a device including a processor and one or more instructions to be executed by the processor, the instructions when executed by the processor resulting in the device determining, at least in part, whether to permit performance by the storage of a request to delete, at least in part, at least one object that includes at least one file stored in the storage, the instructions when executed by the processor also resulting in the device determining, at least in part, whether to permit the performance based at least in part upon an earliest permitted deletion time for the at least one file, the instructions when executed by the processor also resulting in the device determining, based at least in part upon comparison, at one or more times, by the device, of a current time with a latest permitted access time for the at least one file, whether to issue from the device another request that the storage delete the at least one file, the earliest permitted deletion time for the at least one file and the latest permitted access time for the at least one file being to enforce one or more policies;

at least one name of the at least one file, at least one possessor of right to access the at least one file, at least one size of the at least one file, at least one creation time of the at least one file, at least one most recent access time of the at least one file, the earliest permitted deletion time for the at least one file, and the latest permitted access time for the at least one file being indicated by different respective values stored in metadata of the object in the storage;

the device to determine whether the earliest permitted deletion time for the at least one file is prior to the current time, and if the earliest permitted deletion time for the at least one file is prior to the current time, the device is to determine not to permit the performance by the storage of the request to delete; and if the current time is later than the latest permitted access time for the at least one file, the device is to issue the another request that the storage delete the at least one file.

20. The system of claim 19, wherein: the instructions when executed by the processor result in the device periodically examining the latest permitted access time for the at least one file to determine whether a current examination time is contemporaneous with or after the latest permitted access time for the at least one file.

21. The system of claim 19, wherein:

the storage comprises a redundant array of inexpensive disks (RAID) having a RAID level of 1;

the at least one file comprises blocks in the storage and is accessible via a network file system; and the device comprises a storage controller that comprises the processor.

* * * * *

UNITED STATES PATENT AND TRADEMARK OFFICE
CERTIFICATE OF CORRECTION

PATENT NO.        : 8,626,793 B2                     Page 1 of 1
APPLICATION NO.   : 12/696841
DATED             : January 7, 2014
INVENTOR(S)       : Donald F. Cameron et al.

It is certified that error appears in the above-identified patent and that said Letters Patent is hereby corrected as shown below:

On the title page, in item (56), in column 2, under "U.S. Patent Documents", line 4, delete "Ganesh et al" and insert -- Ngai et al --, therefor.

On title page 2, in item (56), in column 2, under "Other Publications", line 39, delete "fro" and insert -- for --, therefor.

In the Claims

In column 9, line 31, in claim 7, delete "priorto" and insert -- prior to --, therefor.

Signed and Sealed this
Twenty-ninth Day of April, 2014

Michelle K. Lee
*Deputy Director of the United States Patent and Trademark Office*